United States Patent [19]

Azuma et al.

[11] Patent Number: 4,656,868

[45] Date of Patent: Apr. 14, 1987

[54] METHOD AND APPARATUS FOR DISCRIMINATING CUTTING STATE FROM NON-CUTTING STATE IN MACHINE TOOL

[75] Inventors: Hidekazu Azuma, Nagoya; Ryozi Yoshinaka, Toyota; Takayuki Tsuruhashi, Toyota; Katsuiku Hokao, Toyota; Kazuki Watanabe, Toyota; Kazutaka Ogo, Aichi; Takatoshi Suzuki, Aichi; Masahiro Hayashi, Aichi, all of Japan

[73] Assignees: Toyota Jidosha Kabushiki Kaisha; Kabushiki Kaisha Toyota Chuo Kenkyusho, both of Aichi, Japan

[21] Appl. No.: 763,220

[22] Filed: Aug. 7, 1985

[30] Foreign Application Priority Data

Sep. 3, 1984 [JP] Japan .................. 59-183955

[51] Int. Cl.$^4$ .................. B23Q 15/00; B23Q 17/12
[52] U.S. Cl. .................. 73/587; 340/680; 408/11; 409/194; 83/72; 51/165.75
[58] Field of Search .................. 73/587, 658, 660, 104, 73/659; 340/680, 683; 408/11, 12; 409/150, 154, 186, 187, 188, 194, 195; 364/474, 475, 508; 83/72; 82/DIG. 9; 51/165.74, 165.75, 165.76, 165.92

[56] References Cited

U.S. PATENT DOCUMENTS

| | | | |
|---|---|---|---|
| 3,550,107 | 12/1970 | Thompson et al. | 73/660 |
| 3,897,659 | 8/1975 | Henry | 51/165.75 |
| 4,072,936 | 2/1978 | Spirig | 340/566 |
| 4,332,161 | 6/1982 | Kakino | 73/104 |
| 4,413,507 | 11/1983 | Drew et al. | 73/587 |
| 4,428,055 | 1/1984 | Kelley et al. | 364/508 |
| 4,441,103 | 4/1984 | Urabe | 51/165.76 |
| 4,507,705 | 3/1985 | Hoshino et al. | 73/658 |
| 4,558,311 | 12/1985 | Forsgren et al. | 73/660 |

FOREIGN PATENT DOCUMENTS

| | | | |
|---|---|---|---|
| 76360 | 6/1981 | Japan | 73/658 |
| 569442 | 8/1977 | U.S.S.R. | 51/165.92 |
| 986615 | 1/1983 | U.S.S.R. | 82/DIG. 9 |

Primary Examiner—Stewart J. Levy
Assistant Examiner—John E. Chapman, Jr.
Attorney, Agent, or Firm—Parkhurst & Oliff

[57] ABSTRACT

An apparatus for discriminating a machining state from a non-machining state in a machine tool wherein a workpiece is machined with a cutting tool or grinder, comprising plural vibration sensors including at least one acoustic-emission sensor, which detect vibrations of different frequency bands, respectively, which are produced during machining of the workpiece by the tool. A discriminating device judges that the workpiece is being machined by the tool when levels of output signals generated from at least two of the vibration sensors are higher than respective predetermined threshold levels, and judges that the workpiece is not being machined by the tool when the level of an output signal generated from less than two of the vibration sensors is higher than a predetermined threshold level. Also disclosed is a method for discrimination between the machining and non-machining states.

8 Claims, 10 Drawing Figures

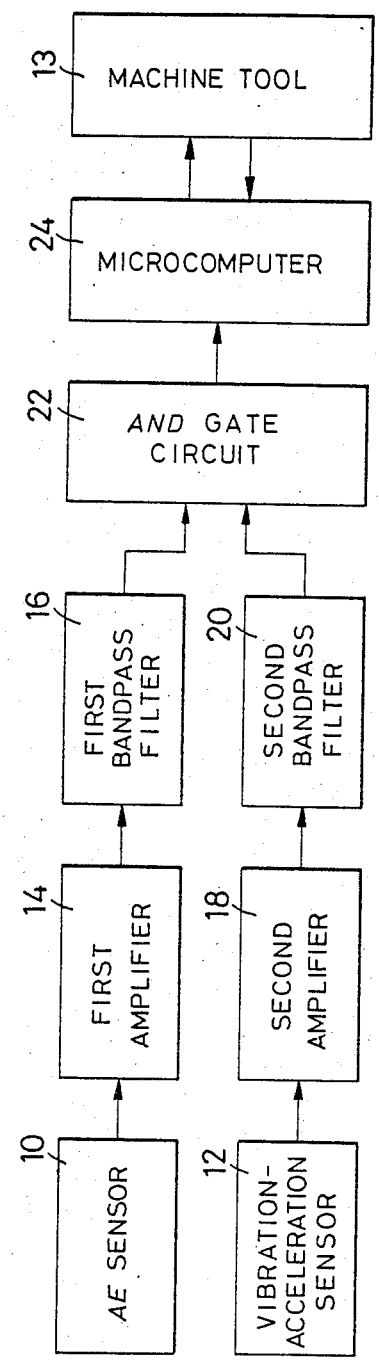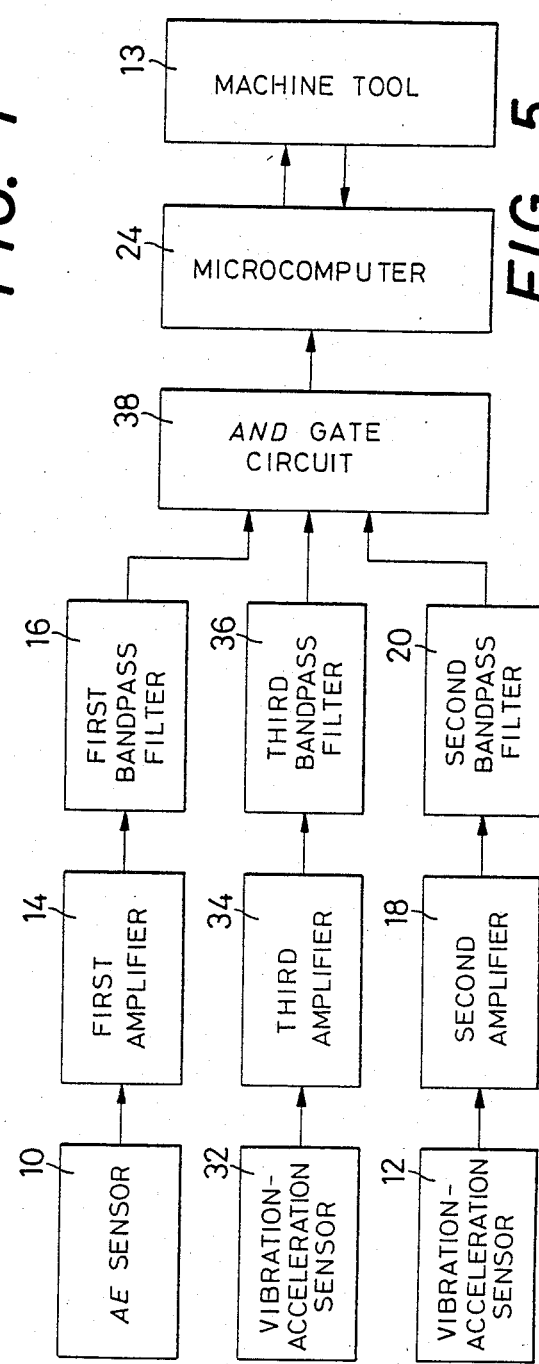

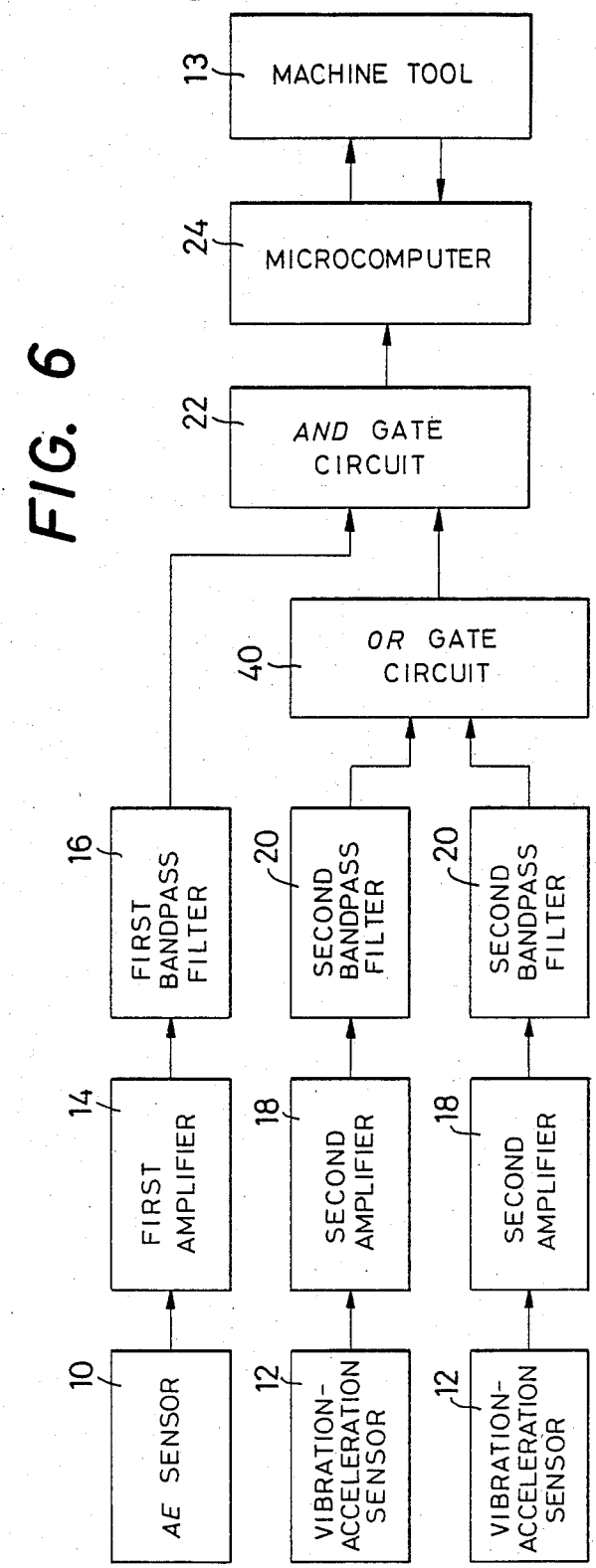

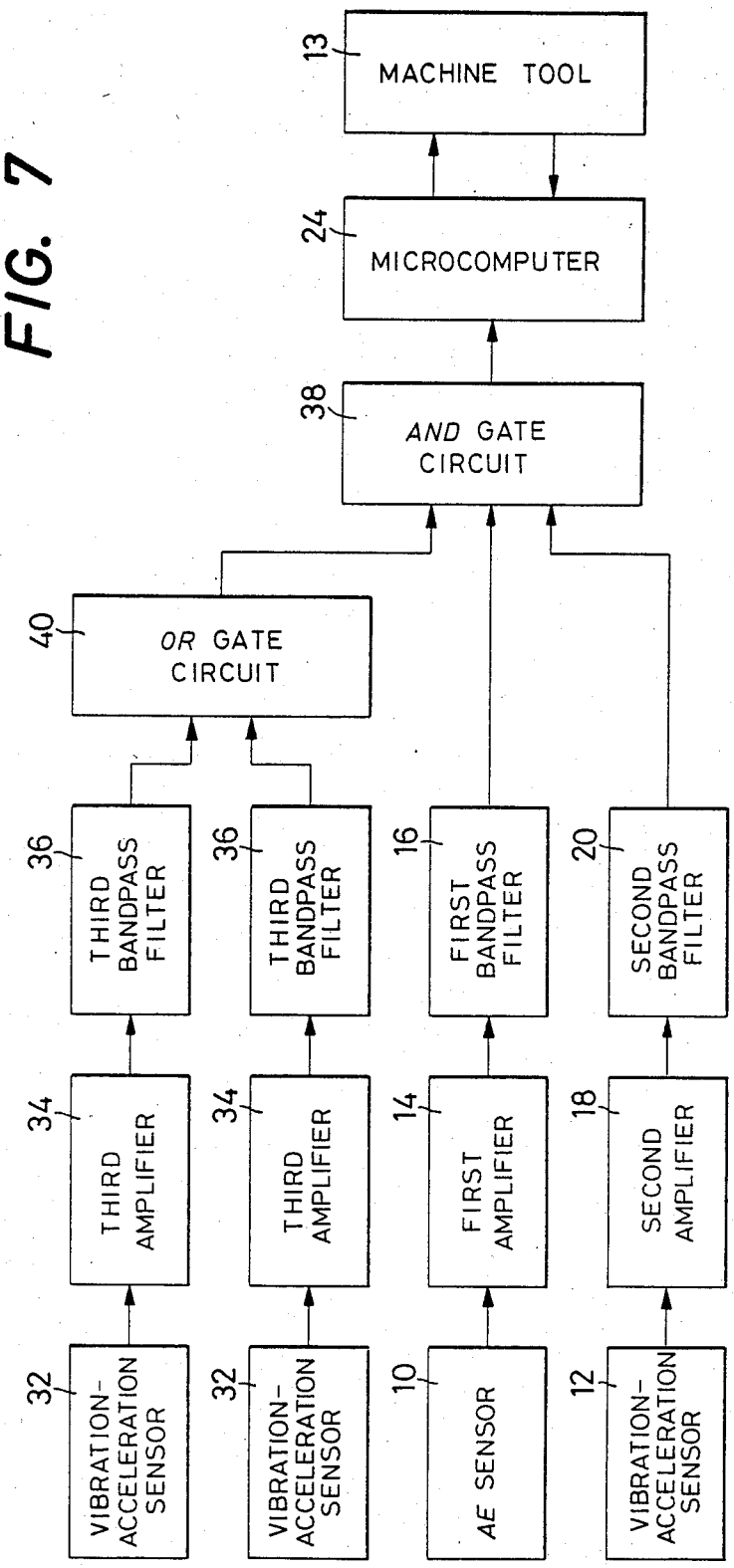

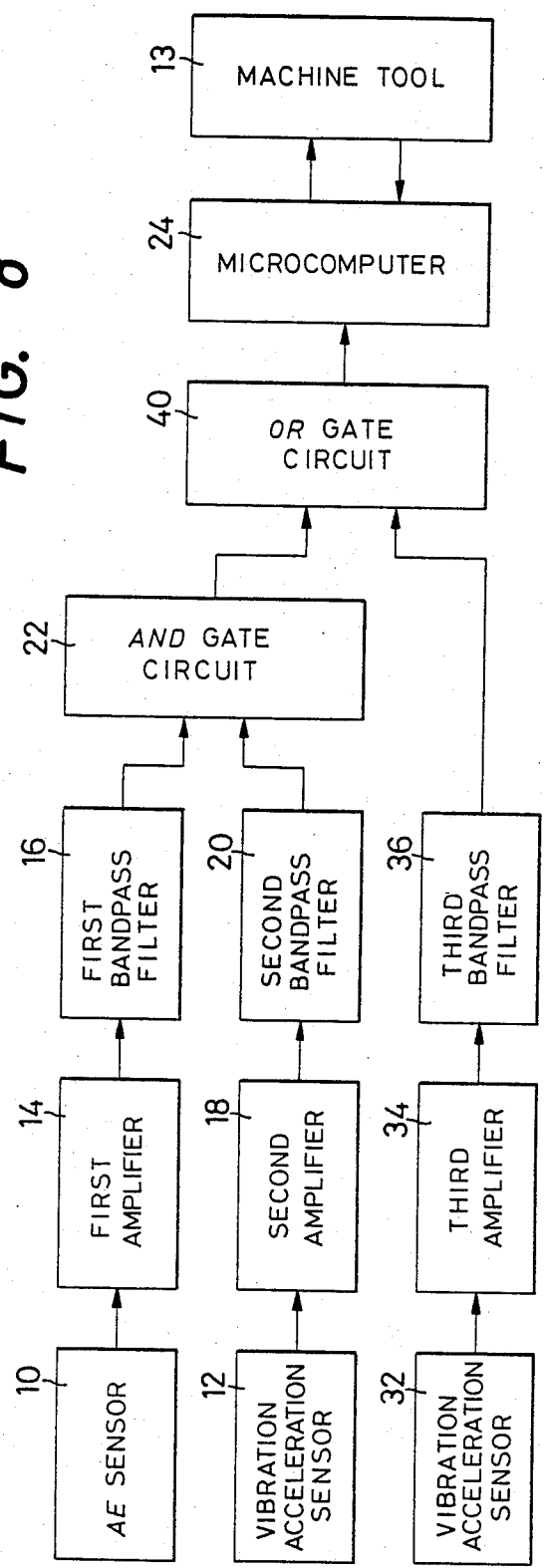

METHOD AND APPARATUS FOR DISCRIMINATING CUTTING STATE FROM NON-CUTTING STATE IN MACHINE TOOL

BACKGROUND OF THE INVENTION

1. Field of the Art

The present invention relates in general to a method and an apparatus for discriminating a machining (cutting or grinding) state from a non-machining state in a machine tool, and more particularly to such method and apparatus for detecting machining actions of a cutting tool or grinder, based on vibrations produced while the workpiece is cut or ground by the tool.

2. Related Art Statement

In machine tools, particularly numerically controlled machine tools controlled by a numerical control system, actual machining actions of a cutting or grinding to machine a workpiece are detected in distinction from non-machining actions of the tool, so that the workpiece is machined based on the obtained information as to whether the tool is currently machining the workpiece or not. In this manner, a machining operation is effected automatically or unattendedly, for maximum machining efficiency.

For detecting actual machining or non-machining of a workpiece by a tool, there have been proposed several methods including that which uses a torque detector incorporated in a spindle drive system to sense a current dynamic torque in the drive system. In this method, a judgement is made as to whether the workpiece is actually cut or not, based on variations in the detected dynamic torque values. In another proposed method, a load current of a drive motor is measured and the machining on the workpiece are sensed according to variations in the measured load current. However, these methods for discrimination between the machining and non-machining actions or states in dependence on the detected torque or load current are not satisfactory in discrimination accuracy and response, and are not considered sufficiently capable of meeting practical requirements.

In the light of the above-indicated inconveniences, an alternative method has been proposed, as disclosed in Japanese Patent Applications which were laid open under Publication Nos. 57-173462 and 57-89751, wherein vibrations that are produced during a cutting operation on a workpiece are detected by a vibration sensor, so that the machining action is sensed based on the presence or absence of a signal from the vibration sensor. This method provides considerable improvements in accuracy and response in discrimination between the machining and non-machining actions.

While the above alternative method is practically satisfactory in terms of discrimination accuracy and response, it still suffers a problem that the vibration sensor may pick up external noises, which may cause erroneous control of the machine tool, because there are no provisions for distinguishing the picked-up external noises from vibrations that are generated due to machining actions of the tool on the workpiece.

SUMMARY OF THE INVENTION

It is accordingly an object of the present invention to provide a reliable method of discriminating a machining state from a non-machining state based on the above-described vibrations which are generated while a workpiece is actually machined by a cutter or grinder, wherein external noises will not affect the discrimination between the machining and non-machining states, and will not cause erroneous control of the machine tool.

Another object of the invention is the provision of an apparatus which is suitable to practice the above-indicated method.

Stated more particularly, research and study by the present inventors indicate that vibrations generated during machining of a workpiece exceed a given level over a relatively wide range of frequency, approximately between 0.1 Hz and 1 MHz, as shown in FIG. 4. In the meantime, the frequency range of external noises is wider than the above-indicated frequency band of the vibrations arising from the machining actions. As indicated in one-dot chain line in the same figure, however, the frequency range in which the external noises are higher than a given level, is comparatively narrow. It is further noted that noises of different frequency bands are rarely generated at once.

According to the present invention, there is provided a method of discriminating a machining state or action from a non-machining state or action in a machine tool wherein a workpiece is machined with a machining tool, which comprises a step of detecting vibrations which are generated during machining of the workpiece by the machining tool, by means of a plurality of vibration sensors which are adapted to detect the vibrations of different frequency bands, respectively, and a step of judging that the workpiece is being machined by the machining tool when output signals from at least two of the vibration sensors are present simultaneously or concurrently, that the workpiece is not being machined by the machining tool when output signals from the at least two vibration sensors are not present simultaneously.

According to the invention, there is also provided an apparatus which is suitable for practicing the above-described method. The apparatus comprises a plurality of vibration sensors which detect vibrations of different frequency bands, respectively, which are produced during cutting of the workpiece, and further comprises discriminating means for judging that the workpiece is being cut by the cutting tool when levels of output signals generated from at lest two of the plural vibration sensors are higher than respective predetermined threshold levels, and for judging that the workpiece is not being cut by the cutting tool when the level of an output signal generated from less than two of the vibration sensors is higher than a predetermined threshold levels.

According to the invention as described above, an actual cut or machining by the tool is detected only when the vibrations due to the actual cutting are sensed simultaneously by at least two of the plural vibration sensors, that is, only when the workpiece is actually cut. Thus, the method and apparatus according to the instant invention assure excellent accuracy and response of discrimination between a machining state and a non-machining state of the machine tool, and the machine tool is kept substantially free from an erroneous control of machining and non-machining movements due to pickup of external noises as experienced in the known arrangements.

The application of the discriminating method and apparatus of the invention to a machine tool, allows accurate automatic or unattended control of the machine tool, for example, of speeds of relative movements between the cutting tool and the workpiece, according to the judgement as to whether the workpiece is actually machined or not, thereby making it possible to increase the machining efficiency and accordingly save the machining cost of the workpiece.

The method and apparatus of the invention are useful particularly for three-dimensional machining systems such as 3 or 5-axis NC machines or die sinking machines, for producing dies or performing other three or five-axis contouring cuts. For instance, the movements of a cutting tool relative to the workpiece are controlled, by the instant apparatus, such that the tool is fed at programmed feedrates while actually cutting actions of the tool are detected, but moved at a rate higher than the programmed feedrates while non-cutting actions of the tool are detected.

According to one advantageous embodiment of the apparatus of the invention, one of the plural vibration sensors is an acoustic-emission sensor which detects an elastic wave of a high frequency band that is to be generated due to breakage or elastic deformation of the workpiece and/or cutting tool. In this case, the plural vibration sensors other than the acoustic-emission sensor may be sensors which detect vibrations of frequency bands which are lower than that of the acoustic-emission sensor.

According to another advantageous embodiment of the apparatus, the discriminating means comprises an AND gate circuit having inputs connected to the at least two vibration sensors. The AND gate circuit generates a first output signal indicative of the cutting state or action of the tool when the levels of output signals from said at least two vibration sensors are higher than the respective predetermined threshold levels. When the levels of an output signal from less than two of the vibration sensors is higher than the predetermined threshold values, the AND gate circuit generates a second output signal indicative of the non-cutting state or action of the tool.

In one form of the above embodiment, the plural vibration sensors comprise at least three vibration sensors outputs of which are connected to the inputs of the AND gate circuit.

In another form of the above embodiment, the plural vibration sensors comprise plural directional vibration sensors which detect vibrations in different directions, and at least one vibration sensor other than the directional vibration sensors. Outputs of the directional vibration sensors are connected to inputs of an OR gate circuit, and an output of the OR gate circuit and an output of said at least one vibration sensor are connected to the inputs of the AND gate circuit.

According to a further advantageous embodiment of the invention, the apparatus further comprises band filters corresponding to the plural vibration sensors, which band filters filter the output signals from the corresponding vibration sensors. In this case, the discriminating means judges that the workpiece is being cut by the tool when levels of output signals from the band filters corresponding to said at least two vibration sensors are higher than the respective predetermined threshold levels.

In the above embodiment, the frequency bands of the vibrations to be detected are determined as needed, by the band filters connected to the corresponding the vibration sensors, irrespective of the frequency bands of the vibration sensors. In other words, the band filters permit the discrimination between the machining and non-machining actions, by picking up the vibrations which fall in desired frequency bands. Further, the use of the band filters provides increased freedom in selecting the vibration sensors.

According to the invention, there is also provided an apparatus of discriminating a grinding state from a non-grinding state in a grinding machine wherein a workpiece is ground with a grinder, comprising a plurality of vibration sensors which detect vibrations of different frequency bands, respectively, which are produced during grinding of the workpiece by the grinder, and further comprising discriminating means for judging that the workpiece is being ground by the grinder when levels of output signals generated from at least two of the vibration sensors are higher than respective predetermined threshold levels, and for judging that the workpiece is not being ground by the grinder when the level of an output signal from less than two of said vibration sensors is higher than a predetermined threshold level.

BRIEF DESCRIPTION OF THE DRAWING

The foregoing and other objects, features and advantages of the present invention will be more apparent to those skilled in the art from reading the following detailed description of several exemplary embodiments of the invention, in conjunction with the accompanying drawing in which:

FIG. 1 is a schematic block diagram of one embodiment of the invention;

FIGS. 5-8 are schematic block diagrams, corresponding to FIG. 1, showing modified embodiments of the invention.

DETAILED DESCRIPTION OF PREFERRED EMBODIMENTS

To further illustrate the method and apparatus of the present invention, several preferred embodiments of the invention will be described in detail, referring to the accompanying drawing.

Figure 2:
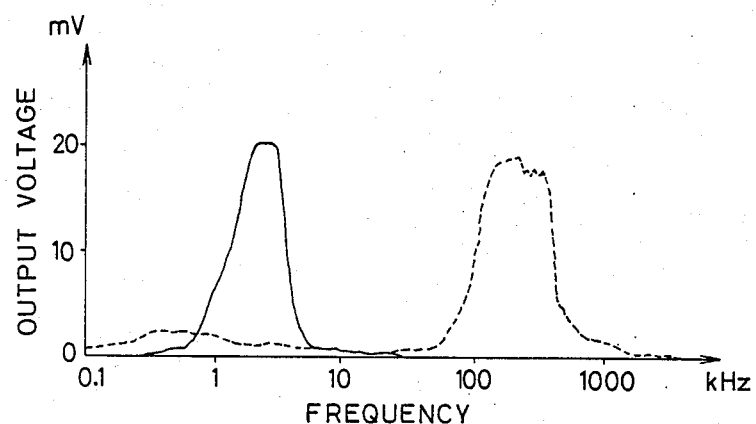
FIG. 2 is a graphical representation of one example of waveform of output signals of two bandpass filters of FIG. 1.
Figure 4:
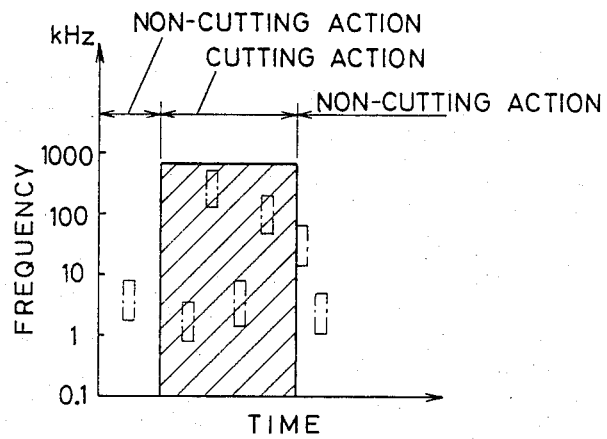
FIG. 4 is a view illustrating frequency-time relations of vibrations generated during cuts on a workpiece, and of external noises.

There are first shown in FIG. 1 an acoustic-emission of acoustic-wave sensor 10 (hereinafter referred to as "AE sensor 10") and a vibration-acceleration sensor 12, both of which serve as vibration sensors. These sensors 10, 12 are disposed on a machine tool 13 such as lathes, milling machines, drilling machines, and grinding machines, which may be numerically controlled. More specifically, the AE sensor 10 and vibration-acceleration sensor 12 are positioned on work holding members of the machine tool 13 such as centers, headstock, spindle head, or tailstock, or disposed at other suitable locations of the machine tool 13 to which vibrations generated during cuts of a workpiece 28 by a cutting tool 26 (FIG. 3) may be transmitted well, so that the transmitted vibrations may be suitably detected by the sensors 10, 12. The AE sensor 10 detects an elastic or acoustic wave of high frequency band, so-called acoustic emission, which is produced due to breakage and/or elastic deformation of the workpiece 28 and/or the cutting tool 26. The detected acoustic wave is applied to a first bandpass filter 16 via a first amplifier 14. In the meantime, the vibration-accleration sensor 12 detects vibrations of a frequency band which is considerably lower than the frequency band of the acoustic wave. The detected vibration is applied to a second bandpass filter 20 via a second amplifier 18. The first and second bandpass filters 16, 20 filter the output signals from the sensors 10, 12 so as to transmit two bands of frequencies which are narrower than the frequency bands of the corresponding sensors 10, 12. The output signals from the bandpass filters 16, 20 are applied to inputs of an AND gate circuit 22. Examples of frequency-voltage waveforms of the output signals from the filters 16, 20 are illustrated in FIG. 2, in broken and solid lines, respectively.

The AND gate circuit 22 serves as discriminating means which generates a first output signal of high level indicative of an actual cut of the workpiece 28 by the tool 26, when the levels of the output signals from the bandpass filters 16, 20 are both above predetermined respective threshold levels. When either one of the output signals is below the predetermined threshold level, the AND gate circuit 22 generates a second output signal of low level indicative of a non-cutting action of the tool 26. These high-level first and low-level second output signals are fed to a microcomputer 24. While the high-level first output signal is generated from the AND gate circuit 22, the microcomputer 24 feeds to the machine tool 13 a low-feed signal representative of a relatively low feedrate at which the cutting tool 26 is fed relative to the workpiece 28 to effect a cutting action. While the low-level second output signal is generated from the AND gate circuit 22, the microcomputer 24 applies to the machine tool 13 to a high-feed signal representative of a relatively high air-cutting rate of feed (so-called "gap-eliminating rate") of the tool 26 relative to the workpiece 28. Position signals indicative of relative positions between the workpiece 28 and the tool 26 are fed back from the controller of the machine tool 13 to the microcomputer 24. Based on these feedback position signals and on a stored cutting program, the microcomputer 24 supplies the machine tool 13 with machining commands to control movements of the cutting tool 26 relative to the workpiece 28.

The operation of the aforementioned discriminating apparatus in cutting the workpiece 28 will be described.

Figure 3A:
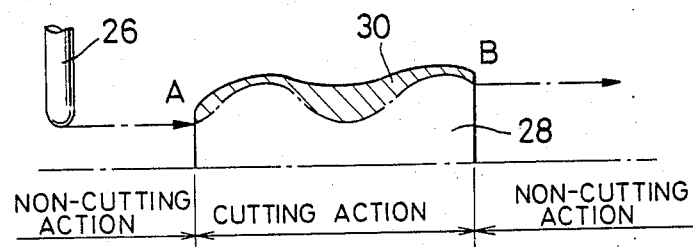
FIG. 3 (a) is a view showing an example of a cutting operation according to the arrangement of FIG. 1.
FIG. 3(b) is a view illustrating an output signal of an AE sensor.
FIG. 3(c) is a view illustrating an output signal of a vibration-acceleration sensor.
Figure 3B:
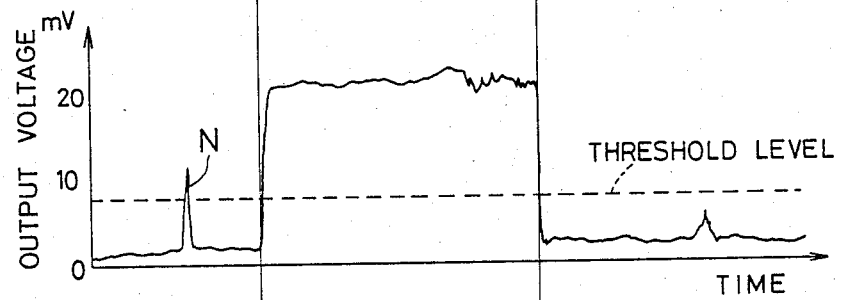
Figure 3C:
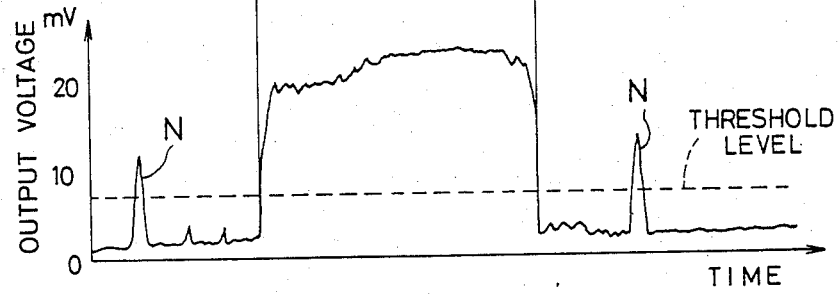

As illustrated in FIG. 3(a), the cutting tool 26 is fed in the direction indicated by arrow, to remove stock 30 from the workpiece 28. Initially, the cutting tool 26 located at its retracted home position is moved at a predetermined rapid traverse rate toward the workpiece 28. When the tool 26 has been moved to a point which is a predetermined distance short of a cutting start position of the stock 30 of the workpiece 28, the rapid traverse rate is reduced to the gap-eliminating rate. This rate is maintained until the tool 26 has been positioned at Point A at which the tool 26 contacts the workpiece 28 and starts a cutting action to remove the stock 30, as indicated in FIG. 3(a). In this connection, it is noted that no vibrations are generated until the machining action is started. Consequently, the AE sensor 10 and the vibration-acceleration sensor 12 pick up only external noises if generated around the machine tool 12 during the non-cutting movement of the tool 26 up to the cutting start Point A, and produce output signals corresponding to the picked-up noises, as indicated in FIGS. 3(b) and 3(c). The external noises may include those noises whose levels are higher than the predetermined threshold levels of the AND gate 22, as indicated at N in the figures. Generally, however, the noises higher than the threshold levels tend to fall in a relatively narrow frequency band, and be generated at random. Accordingly, there is a rare possibility that such noises higher than the threshold levels are picked up at the same time by both of the AE sensor 10 and the vibration-acceleration sensor 12. Therefore, the AND gate 22 produces the second output signal of low level, which causes the tool 26 to be fed at the gap-eliminating or air-cutting rate (a rate higher than a predetermined feedrate) until the gap between the tool 26 and the surface of the stock 30 is eliminated.

When the tool 26 has been advanced to the Point A, and contacted the stock 30 to be removed, the machining action of the tool 26 on the workpiece 28 is started. As a result, vibrations of high amplitude are generated over an approximate frequency range of 0.1–1 MHz. In this condition, the sensors 10, 12 produce output signals whose levels are above the threshold levels, as indicated in FIGS. 3(b) and 3(c) of the AND gate circuit 22, respectively, whereby the AND gate circuit 22 generates the first output signal of high level, which causes the cutting tool 26 to be fed at a predetermined, relatively low feedrate suitable for cutting the workpiece 28, until the tool 26 reaches Point B indicated in FIG. 3(a). When the tool 26 has been fed to the Point B at which the cutting action of the tool 26 is terminated, the sensors 10, 12 do not pick up vibration generated due to cutting of the workpiece 28, and pick up only the external noises if generated. Hence, the AND gate circuit 22 applies the low-level second output signal to the microcomputer 24, whereby the tool 26 is fed at the gap-eliminating rate for non-cutting or air-cutting movement of tool 26.

As described above, the machining state and the non-machining state are accurately discriminated from each other, even if the external noises of high level are picked up by the sensors 10, 12. In other words, the output signal from the AND gate circuit 22 exactly represents the actual cutting or non-cutting state of the tool 26, with least possibility of erroneous discrimination due to the external noises. Since the frequency bands which are detected by the AE sensor 10 and the vibration-acceleration sensor 12 are different to a large extent, otherwise possible erroneous discrimination between the cutting and non-cutting actions is prevented even in the environments where noises of a wide frequency range are generated.

Another embodiment of the invention will be described by reference to FIG. 5.

In this modified embodiment, the machine tool 13 is equipped with another vibration-acceleration sensor 32 in addition to the AE sensor 10 and the vibration-acceleration sensor 12. This additional vibration-acceleration sensor 32 detects vibrations of another frequency band which is different from the frequency bands of the sensors 10, 12. An output signal from the vibration-acceleration sensor 32 is applied via a third amplifier 34 and a third bandpass filter 36 to discriminating means in the form of a three-input AND gate circuit 38 to which the outputs of the AE sensor 10 and the vibration-acceleration sensor 12 are also connected. The AND gate circuit 38 produces a first output signal of high level to effect a cutting feed, when the output signals from all of the three sensors 10, 12 and 32 are higher than the respective predetermined threshold levels. In other conditions, the AND gate circuit 38 generates a second output signal of low level to effect a gap-eliminating or air-cutting feed. These first and second output signals are applied to the microcomputer 24. In this arrangement wherein the three sensors are used, the possibility of simultaneous pickup of external noises by the three sensors is further reduced, and consequently the possibility of erroneous discrimination between the cutting and non-cutting states is accordingly reduced, whereby the discriminating reliability is accordingly increased. It is possible that more than three vibration sensors be employed for further improvement of the discriminating reliability.

In the case where vibrations to be generated during cuts of the workpiece take place in different directions, it is appreciated to arrange the discriminating apparatus as shown in FIG. 6. In this arrangement, two directional vibration-acceleration sensors 12, having the same frequency bands are used to detect vibrations in different directions, for example, X-axis vibrations and Y-axis vibrations, respectively, which arise under different cutting conditions. Outputs of these two directional vibration sensors 12, are connected to inputs of an OR gate circuit 40. The inputs of the AND gate circuit 22 receive an output signal from the OR gate 40 and the output signal from the AE sensor 10. In this case, the discrimination between the cutting and non-cutting actions is reliably and stably accomplished, even where the direction of vibrations to be generated during cutting actions is changed depending upon specific cutting conditions. If the frequency characteristics of the vibrations in one direction is largely different from that of the vibrations in another direction, it is possible to use vibration-acceleration sensors which have different frequency bands.

A further modified embodiment of the invention is illustrated in FIG. 7, wherein two additional vibration-acceleration sensors 32, 32 are provided on the machine tool 13, as a third and a fourth vibration sensor, in addition to the AE sensor 10 and the vibration-acceleration sensor 12. These third and fourth vibration-acceleration sensors 32, 32 detect vibrations of different directions. Output signals from the two directional vibration sensors 32, 32 are fed to the OR gate circuit 40 whose output is applied to the AND gate circuit 38 which also receives the output signals from the AE sensor 10 and the vibration-acceleration sensor 12. This arrangement is effective particularly when the directions of the vibrations corresponding to the frequency bands of the two sensors 32 are different from each other due to difference in the cutting conditions.

A still further modified embodiment of the invention is illustrated in FIG. 8, which is substantially identical to that of FIG. 1, except the use of an additional vibration-acceleration sensor 32 whose output signal is not applied to the discriminating AND gate circuit 22. The sensor 32 has a frequency band in which external noises higher than the threshold level are not expected to be generated. In some relatively small-sized machine shops or factories, there is a rare possibility that noises of such high frequencies are generated.

While the present invention has been described in its preferred embodiments, it is to be understood that the invention is not confined to the precise disclosure of these illustrated embodiments.

For example, while the output signal from plural vibration sensors are all applied to a discriminating AND gate circuit via respective bandpass filters, it is possible to eliminate such bandpass filters. Namely, the output signals from the vibration sensors may be fed directly to the AND gate circuit to achieve the intended discrimination between cutting and non-cutting actions of the cutting tool on the workpiece.

In all of the illustrated embodiments, the AE sensor 10 which detects an elastic or acoustic wave is used as one of plural vibration sensors. However, the discriminating apparatus according to the invention does not need to use such an acoustic-emission or acoustic-wave sensor. That is, the apparatus may use only vibration-acceleration sensors. At any rate, the apparatus should include plural vibration sensors, so that they do not detect at the same time random noises whose levels are higher than predetermined threshold levels.

Further, an AND gate circuit used in the illustrated embodiments as discriminating means may be eliminated. In this case, the microcomputer 24 is adapted to serve as discriminating means for distinguishing an actual cutting action from a non-cutting action.

It will be obvious that other changes and modifications may be made in the invention without departing from the scope of the invention defined in the appended claims.

What is claimed is:

1. A method of discriminating a machining state from a non-machining state in a machine tool wherein a workpiece is machined with a machining tool, comprising the steps of:

detecting vibrations and acoustic emissions produced during machining of the workpiece by said machining tool, by a plurality of vibration sensors including at least one acoustic-emission sensor, said plurality of vibration sensors being adpated to detect vibrations of different frequency bands, respectively; and judging that the workpiece is being machined by said machining tool when output signals from at least two of said vibration sensors are present simultaneously, and that the workpiece is not being machined by the machining tool when output signals from said at least two vibration sensors are not present simultaneously.

2. An apparatus for discriminating a cutting state from a non-cutting state in a machine tool wherein a workpiece is cut with a cutting tool, comprising:

a plurality of vibration sensors which detect vibrations of different frequency bands, respectively, which are produced during cutting of the workpiece by the cutting tool; and discriminating means for judging that the workpiece is being cut by the cutting tool when levels of output signals generated from at least two of said vibration sensors are higher than respective predetermined threshold levels, and for judging that the workpiece is not being cut by the cutting tool when the level of an output signal generated from less than two of said vibration sensors is higher than a predetermined threshold level, one of said plurality of vibration sensors being an acoustic-emission sensor which detects an elastic wave of a high frequency band that is generated due to breakage or elastic deformation of the workpiece or said cutting tool.

3. An apparatus as recited in claim 2, wherein said plural vibration sensors other than said acoustic-emission sensor are sensors which detect vibrations of frequency bands which are lower than that of said acoustic-emission sensor.

4. An apparatus as recited in claim 2, wherein said discriminating means comprises an AND gate circuit having inputs connected to said at least two vibration sensors, said AND gate circuit generating a first output signal indicative of the cutting state when the levels of output signals from said at least two vibration sensors are higher than said respective predetermined threshold levels, and generating a second output signal indicative of the non-cutting state when the level of an output signal from less than two of said vibration sensors is higher than said predetermined threshold level.

5. An apparatus as recited in claim 4, wherein said plural vibration sensors comprise at least three vibration sensors having outputs connected to the inputs of said AND gate circuit.

6. An apparatus as recited in claim 4, wherein said plural vibration sensors comprise plural directional vibration sensors which detect vibrations in different directions, and at least one vibration sensor other than said directional vibration sensors, outputs of said directional vibration sensors being connected to inputs of an OR gate circuit, an output of said OR gate circuit and an output of said at least one vibration sensor being connected to the inputs of said AND gate circuit.

7. An apparatus as recited in claim 4, further comprising band filters corresponding to said plural vibration sensors, said band filters filtering the output signals from the corresponding vibration sensors, said discriminating means judging that the workpiece is being cut by the cutting tool when levels of output signals from the band filters corresponding to said at least two vibration sensors are higher than the respective predetermined threshold levels.

8. An apparatus for discriminating a grinding state from a non-grinding state in a grinding machine wherein a workpiece is ground with a grinder, comprising:
a plurality of vibration sensors including at least one acoustic-emission sensor, which detect vibrations of different frequency bands, respectively, which are produced during grinding of the workpiece by the grinder; and
discriminating means for judging that the workpiece is being ground by the grinder when levels of output signals generated from at least two of said vibration sensors are higher than respective predetermined threshold levels, and for judging that the workpiece is not being ground by the grinder when the level of an output signal from less than two of said vibration sensors is higher than a predetermined threshold level.

* * * * *